United States Patent
Ivanic

(10) Patent No.: US 12,269,714 B2
(45) Date of Patent: Apr. 8, 2025

(54) CONNECTION DEVICE FOR COUPLING A LOAD TO A LIFTING LUG BY MEANS OF A SUPPORT BOLT

(71) Applicant: pewag austria GmbH, Kapfenberg (AT)

(72) Inventor: Ranko Ivanic, Bruck an der Mur (AT)

(73) Assignee: pewag austria GmbH, Kapfenberg (AT)

( * ) Notice: Subject to any disclaimer, the term of this patent is extended or adjusted under 35 U.S.C. 154(b) by 877 days.

(21) Appl. No.: 17/126,894

(22) Filed: Dec. 18, 2020

(65) Prior Publication Data

US 2021/0206603 A1    Jul. 8, 2021

(30) Foreign Application Priority Data

Dec. 19, 2019 (DE) .......................... 102019135324.6

(51) Int. Cl.
  *F16B 21/16* (2006.01)
  *B66C 1/66* (2006.01)

(52) U.S. Cl.
  CPC .............. *B66C 1/66* (2013.01); *F16B 21/165* (2013.01)

(58) Field of Classification Search
  CPC ...... F16B 21/16; F16B 21/165; F16B 45/002; Y10S 403/06; Y10T 403/32213; Y10T 403/592; Y10T 403/597; B66C 1/66; B66C 1/666
  USPC ...................................................... 294/215
  See application file for complete search history.

(56) References Cited

U.S. PATENT DOCUMENTS

| 5,248,176 A | 9/1993 | Fredriksson |
| 6,068,310 A * | 5/2000 | Fuller ....................... B66C 1/66 294/215 |
| 6,398,447 B1 * | 6/2002 | Pearl ........................ B66C 1/66 403/164 |

(Continued)

FOREIGN PATENT DOCUMENTS

| AT | 13 457 U1 | 12/2013 | |
| CN | 117869449 A * | 4/2024 | ............... B66C 1/66 |

(Continued)

OTHER PUBLICATIONS

JP 2008143685 A, Espacenet English Translation, 2008 (Year: 2008).*

(Continued)

*Primary Examiner* — Michael P Ferguson
*Assistant Examiner* — Zachary A Hall
(74) *Attorney, Agent, or Firm* — Bradley J. Thorson; DeWitt LLP

(57) ABSTRACT

A connection device for coupling a load to a lifting lug with a support bolt which is rotatable in a through-opening of a ring holder. The support bolt has a threaded shaft and a bolt head which protrudes radially, and which can also be rotated therewith relative to the lifting lug. The ring holder is covered at the lower side thereof by an end flange at the lower end of a sleeve which is releasably secured to the support bolt by tension in an axial direction. The ring holder has at least one locking member for the bolt head which blocks the bolt head from rotation in a locking position and which is not in engagement with the bolt head in an initial position. The support bolt is supported in the through-opening of the ring holder with a ball bearing, and the lifting lug is an open ring.

9 Claims, 3 Drawing Sheets

(56) References Cited

U.S. PATENT DOCUMENTS

| | | | | |
|---|---|---|---|---|
| 6,578,889 | B2 * | 6/2003 | Pearl | B66C 1/66 |
| | | | | 294/215 |
| 6,749,237 | B1 * | 6/2004 | Ma | B66C 1/66 |
| | | | | 294/219 |
| 7,114,872 | B2 | 10/2006 | Alba | |
| 9,188,151 | B2 * | 11/2015 | Ivanic | B60P 7/0807 |
| 9,193,570 | B2 * | 11/2015 | Norpoth | B66C 1/66 |
| 2013/0251444 | A1 | 9/2013 | Ivanic et al. | |
| 2024/0240697 | A1 * | 7/2024 | Codega | F16B 45/023 |

FOREIGN PATENT DOCUMENTS

| | | | | |
|---|---|---|---|---|
| DE | 4336779 | A1 | 4/1995 | |
| EP | 0462963 | B1 | 8/1994 | |
| EP | 2646698 | B1 | 8/2015 | |
| JP | 3116260 | U | 12/2005 | |
| JP | 2007 162868 | A | 6/2007 | |
| JP | 2008-143685 | A | 6/2008 | |
| WO | WO-2012037368 | A2 * | 3/2012 | B66C 1/10 |
| WO | 2013/159859 | A1 | 10/2013 | |

OTHER PUBLICATIONS

European Search Report for EP No. 20 21 4162, issued May 10, 2021 (1 pg).

Japanese Patent Office, Preliminary Notice of Reasons for Rejection for corresponding Pat. App. 2020-208013 dated Dec. 17, 2024, 4 pages. of English translation, 2 pages.

\* cited by examiner

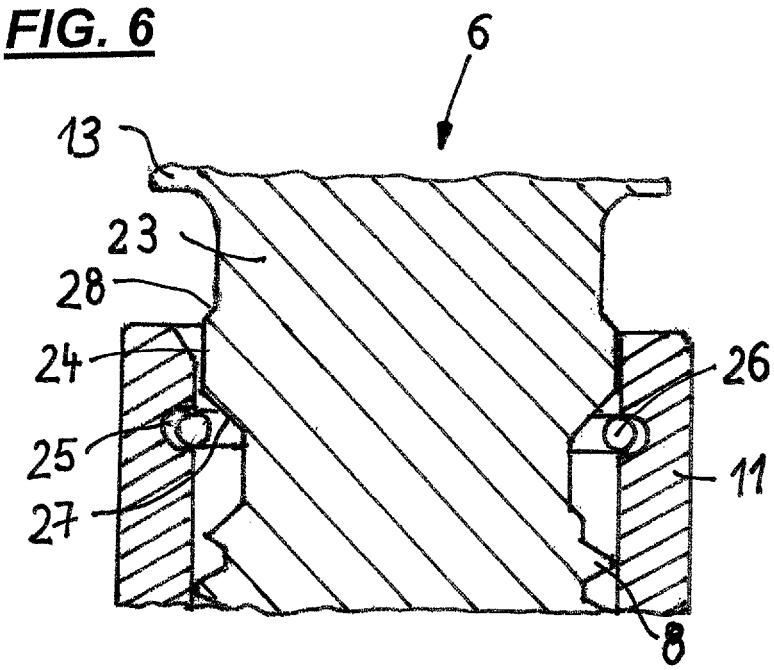
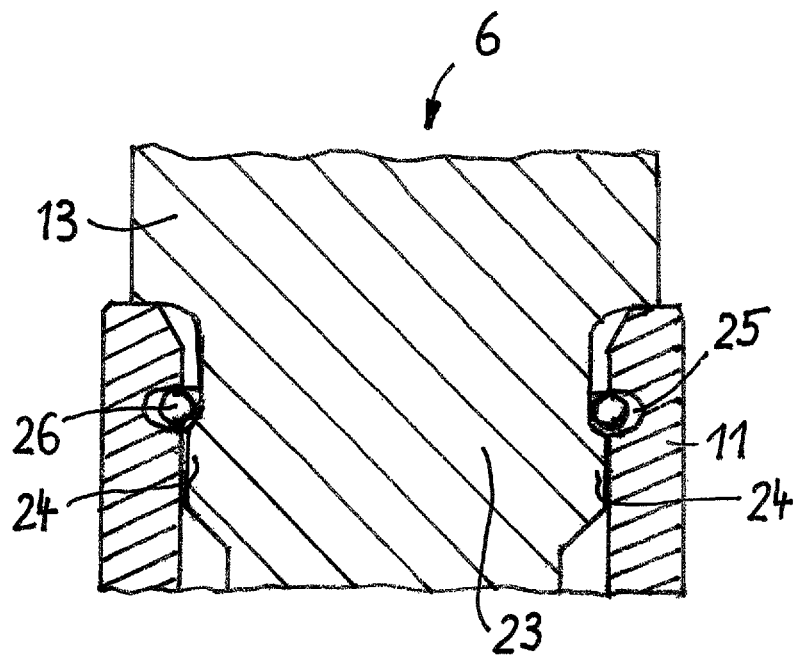

CONNECTION DEVICE FOR COUPLING A LOAD TO A LIFTING LUG BY MEANS OF A SUPPORT BOLT

RELATED APPLICATION

The present application claims the benefit of German Application No. DE 102019135324.6, filed Dec. 19, 2019, said application being hereby incorporated herein in its entirety by reference.

TECHNICAL FIELD

The invention relates to a connection device for coupling a load to a lifting lug by means of a support bolt, wherein the support bolt is located so as to be able to be rotated about the longitudinal axis thereof in the through-opening of a ring holder, has a threaded shaft and a bolt head which protrudes radially beyond it and can also be rotated therewith relative to the lifting lug with a coupled load.

BACKGROUND

Such connection devices, in which a support bolt having a threaded shaft in order to couple a load which is intended to be received is guided through a through-opening of a connection component which is fitted to the lifting lug or which can be connected thereto, are known in many different arrangements and are also frequently used.

Thus, EP 2 646 698 B1 describes such a connection device in the form of an annular screw, in which a through-opening for the support bolt is provided in a connection component which is itself formed on the lifting lug and at the upper side of which the bolt head of the support bolt is supported with the lower side thereof on an abutment face of the connection component which extends around the through-opening. In this instance, at least one locking member is provided and can be brought into or out of engagement with the bolt head and blocks it in terms of rotation in a locking position, whilst it is released again in the other position. As a result of these locking members, for the activation of which a separate tool no longer has to be used, a very space-saving arrangement can be achieved, as a result of which this known connection device can also be used when only a small space is available. In this instance, as a result of such locking members, relatively large torques can also be transmitted by the lifting lug in the rotational direction of the support bolt.

With this known connection device, however, it is not possible to suspend closed slings (such as a cable loop, a textile loop, or the like) in the lifting lug. In addition, in this known annular screw, an orientation of the support bolt in the load direction with rotational blocking of the bolt head by the at least one locking member which is located in the locking position thereof cannot be carried out so that this annular screw when it is used potentially cannot be completely screwed in or can even become unscrewed.

In other known connection devices (U.S. Pat. No. 7,114, 872 B2, EP 0 462 963 B1), lifting lugs in the form of an open ring are used, the end regions of which are orientated toward each other and which engage in each case in an opening which is located in a ring holder in which the through-opening for the support bolt is formed, at the side of the through-opening. In these arrangements, by removing the ring holder and the support bolt, the lifting lug in the form of an open ring can be exposed in order to suspend closed slings and subsequently to reassemble the finished whole arrangement. In this instance, however, these known connection devices have a relatively complex overall construction, for which reason the construction and the installation of the ring holder with the support bolt is extremely complex and difficult and consequently costly.

When a load is mounted on the support bolt, in these connection devices the arrangement of the support bolt which is fitted in a ring holder, which arrangement is retained on the lifting lug, by using components which can be rotated with respect to each other is configured in such a manner that the support bolt, even with a screwed-on load, can be rotated relative to the lifting lug about the center axis thereof, and consequently an orientation of the support bolt in the load direction is enabled. In this instance, however, when heavy loads are coupled to the support bolt in the event of orientation movements, significant friction forces may occur between components which slide on each other, which involves the risk of undesirable wear. When a torque acts on the support bolt counter to the screwing-in movement of the support bolt, in specific situations this may also lead to the support bolt even being rotated in the unscrewing direction.

A connection device of the type mentioned in the introduction is known from DE 43 36 779 A1. In this connection device, the bolt head of the support bolt is located in a recess of a ring holder which is itself rotatably supported on a connection component via which it is pivotably articulated to a lifting lug. In this instance, the ring holder is connected to the connection component in the region axially above the bolt head via a ball bearing. With a suspended load, an orientation of the support bolt in the load direction can be carried out via the relative rotatability of the ring holder with respect to the connection component, wherein the friction forces which occur are only relatively low. In this known connection device, however, an assembly on the load which is intended to be received cannot be carried out without tools since for this purpose, during the screwing-in operation, a positive-locking connection between the bolt head and the connection component has to be produced. Furthermore, the installation of a closed sling is also not possible.

SUMMARY

Based on this, the invention is based on developing such a connection device in such a manner that, with a particularly simple construction, it enables in particular tool-free assembly on the load which is intended to be received and also the installation of closed slings can be carried out in a simple and rapid manner.

To this end, with a connection device of the type mentioned in the introduction, there is provision for the ring holder to be covered at the lower side thereof by an end flange which radially protrudes at the lower end of a sleeve which can be rotated about the support bolt and which is releasably secured thereto by means of tension in an axial direction, there to be provided on the ring holder at least one locking member which can be brought into engagement with the bolt head and which can be moved into a locking position and into an initial position, wherein it blocks the bolt head in terms of rotation with respect to the ring holder in the locking position and is not in engagement with the bolt head in the initial position, the support bolt to be supported in the through-opening of the ring holder by means of a ball bearing, and the lifting lug to be constructed as an open ring, the two end regions of which in each case extend in the direction toward each other and in the assembled state at mutually opposing sides run radially into recesses which are formed on the lower side of the ring holder and which are in each case open therein in a downward direction.

The connection device according to the invention initially has a relatively simple construction which enables rapid removal of the ring holder with the support bolt and locking members from the two end regions of the lifting lug.

In the assembled state, the connection device according to the invention, even when it is not coupled to any load which is intended to be received, forms an enclosed unit, wherein the lower side of the ring holder is radially covered by the radially protruding end flange of the sleeve which is releasably secured to the support bolt and which can be rotated about it. In this state, the two end regions of the lifting lug which is constructed as an open ring, which end regions run at mutually opposing sides into recesses in the ring holder which are formed therein and which are open in a downward direction, may be covered by the radially protruding end flange of the sleeve so that they cannot escape downward out of these open recesses.

If, however, a closed sling is intended to be suspended in the lifting lug, it is only necessary to pull down the sleeve which is releasably secured to the support bolt by means of tension in an axial direction and to remove it from the support bolt with the end flange thereof, whereby the open recesses in the ring holder in which the end regions of the lifting lug are received are now open in a downward direction. In this state, the ring holder together with the support bolt can be pulled upward from these end regions of the lifting lug and then also removed.

In the remaining lifting lug with the now open portion thereof between the two end regions thereof, the desired closed sling can now be introduced into the inner region of the face surrounded by the lifting lug, subsequently the ring holder together with the support bolt with the two lower open recesses thereof can be placed on the end regions of the lifting lug again and, by subsequently inserting the sleeve with the radially protruding end flange thereof, be pushed upward from below on the support bolt until it is (releasably) secured again in the assembly position thereof on the support bolt so that the original assembled state of the entire connection device is achieved again, wherein, however, the desired closed sling is now suspended in the lifting lug.

As a result of the fitting of at least one locking member which can be brought into engagement with the bolt head to the ring holder which can be moved into a locking position and into an initial position in which it is no longer in engagement with the bolt head, and for the activation of which a separate tool is no longer required, the connection device according to the invention can, by moving the at least one locking member into the locking position thereof by rotating the lifting lug for connecting a load which is intended to be received to the support bolt, be screwed into a threaded hole fitted thereto or inserted therein through a receiving hole and at the free end of the support bolt can be tensioned by means of a nut counter to the load. In this instance, the introduction of relatively large torques from the lifting lug in the rotation direction of the support bolt is also readily possible.

As a result of the support of the support bolt directly in the through-opening of the ring holder using a ball bearing, it is possible, when the support bolt is not blocked in terms of rotation in the through-opening by the at least one locking member, for a very easy rotation of the support bolt in the ring holder and consequently with a suspended load also an easy orientation of the support bolt in the load direction to be able to be carried out.

When the at least one locking member is constructed on the ring holder, in a quite particularly preferred manner it is constructed as a tilting lever which can be readily manually tilted by the operator.

The construction of the support bolt can be carried out in any appropriate manner, wherein the bolt head is, however, in a particularly preferred manner constructed in hexagonal form when viewed from above.

The support bolt is further preferably supported in the region thereof between the lower side of the bolt head and the beginning of the threaded shaft thereof in the through-opening of the ring holder by means of the ball bearing. In this instance, the support bolt is advantageously provided with a guiding groove in which balls of the ball bearing travel.

A particularly preferred embodiment of the connection device according to the invention also involves in the assembled state, for the securing between the support bolt and sleeve which can be released by means of tension in an axial direction, for connection between the two, the insertion of a snap ring which, preferably by means of inclined starting members which are fitted to the shaft of the support bolt on a radial bead at that location, both when the sleeve is axially fitted to the shaft and when the sleeve is axially removed therefrom, is expanded accordingly in a peripheral receiving groove which is arranged for it at the inner side of the sleeve, whereby the snap ring in a subsequent relative axial movement between the sleeve and support bolt via the radial bead on the support bolt shaft can be guided away until it reaches a securing position behind the radial bead or in order to release the securing position in the event of an axial tensile force. The axial tensile forces which are intended to be used in this instance are so small that they can generally be applied manually with little difficulty.

As a result of the invention, a connection device is provided and, with a quite surprisingly simple structure also permits with a suspended load, an easy orientation of the support bolt in a load direction. Furthermore, it is possible without the use of a tool to block the support bolt via the bolt head on the ring holder in the rotation direction, wherein, as a result of the at least one locking member used, relatively large torques can be transmitted to the support bolt via the lifting lug.

The use of a sleeve which is secured to the support bolt in the assembled state and the securing of which thereto can be released by means of tension in an axial direction and which by means of an end flange which protrudes at the lower end thereof covers the lower side of the ring holder allows, in the assembled state, an enclosed construction of the connection device according to the invention to be achieved. In this instance, via the rotational blocking of the support bolt in the locking position of the at least one locking member, a screwing-in of the threaded shaft of the support bolt in a corresponding receiving thread formed in the load which is intended to be received or an insertion of the support bolt through a through-opening in the load and the screwing-on of a retention nut on the end region of the support bolt which protrudes at the opposite side of the load can be carried out directly without any tools having to be used in this instance.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The invention is explained in greater detail below in principle by way of example with reference to the drawings, in which:

FIG. 6 is an enlarged sectioned illustration of a detailed cut-out of the sleeve with a snap ring when axially pushed onto the support bolt before reaching a securing end position, and FIG. 7 is a sectioned illustration according to FIG. 6, but in which the sleeve has reached its assembly end position on the support bolt.

DETAILED DESCRIPTION OF THE DRAWINGS

Figure 1:
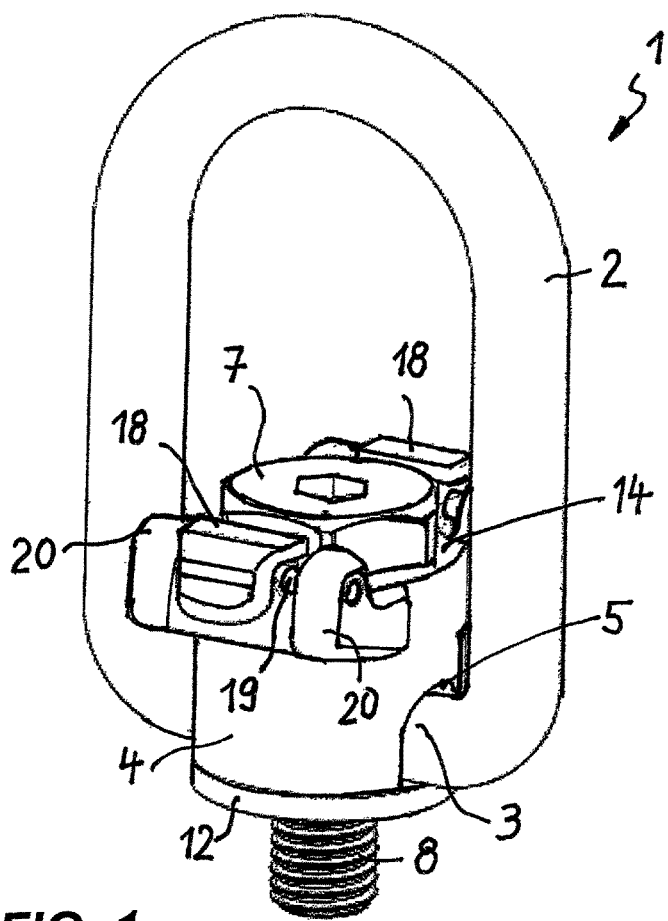
FIG. 1 is a perspective overall view of a connection device according to the invention with two locking members for the head of the support bolt which are not in the locking position.

In the following description of the Figures, an embodiment of a connection device according to the invention is illustrated, wherein the same reference numerals in different Figures always refer to the same components.

Figure 2:
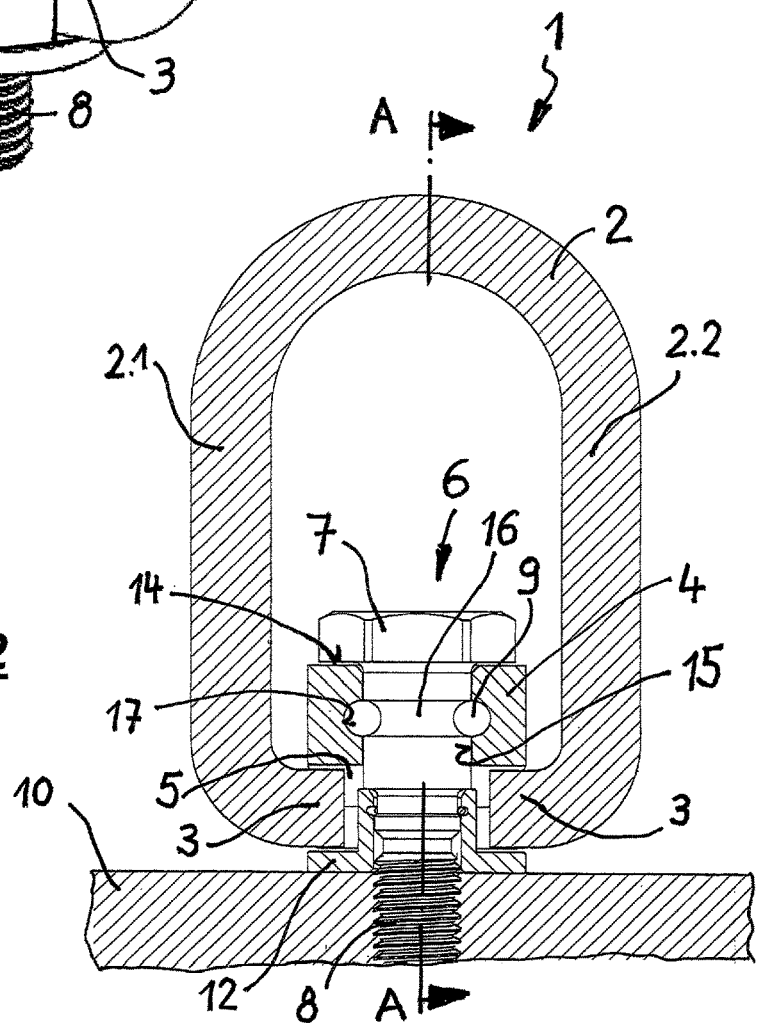
FIG. 2 is a section through the connection device of FIG. 1, wherein the plane of section is located in the clamping plane of the center axis of the lifting lug.

FIG. 1 is a perspective side view of a connection device 1 according to the invention in the assembled state and FIG. 2 shows a section through this connection device 1 from FIG. 1, wherein the plane of section extends parallel with the clamping plane of the lifting lug 2 and through the rotation axle of the support bolt.

Figure 3:
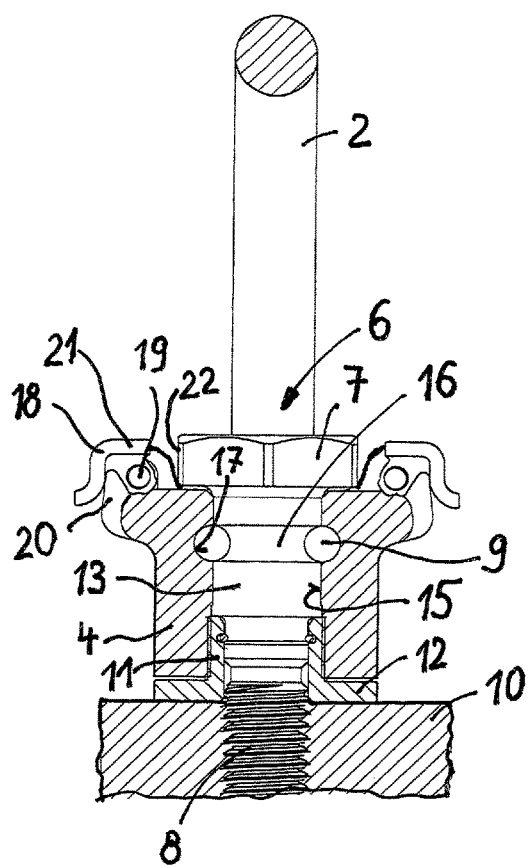
FIG. 3 is a section through the arrangement according to FIG. 2 according to the section location A-A.

FIG. 3 finally illustrates another section along the section position A-A (according to FIG. 2).

As can be seen in particular in the section of FIG. 2, the lifting lug 2 with which the entire connection device 1 with a coupled load 10 can be connected to a suitable lifting device is constructed in the form of an open ring.

The two end regions 3 of the lifting lug 2 between which the open annular location is located are constructed in such a manner that they are in each case bent in a direction toward each other by one of the two side members 2.1 or 2.2 of the lifting lug 2, as shown in detail in FIG. 2 (or also in the illustration of FIG. 4), to which reference is made. In the embodiment shown, the bending of the end regions 3 extends from the respective side member 2.1 or 2.2 in such a manner that these end regions 3 are located perpendicularly to the side members 2.1 and 2.2. In this instance, the construction of the end regions 3 is carried out in such a manner that they are orientated symmetrically relative to the longitudinal axis of the lifting lug 2 which is located in the section position A-A shown in FIG. 2.

The connection device 1 further comprises a ring holder 4 which has at the lower side thereof in a mutually diametrically opposed manner two downwardly open recesses 5 into each of which in the assembled state one of the end regions 3 of the lifting lug 3 radially runs. In this regard, particular reference may be made to the illustrations of FIG. 2 and FIG. 4.

In this instance, each of the recesses 5 is constructed to be slightly larger in cross-section than the cross-section of the protruding end region 3 of the lifting lug 2.

In the ring holder 4 there is further provided centrally a through-opening 15 which extends axially through it and in which a support bolt 6 is located so as to be able to be rotated about the longitudinal axis thereof.

The support bolt 6 has at the top a bolt head 7 and, with axial spacing therefrom, a threaded shaft 8 which in the assembled state of the connection device 1 protrudes axially at the lower side of the ring holder 4 by a predetermined length, as shown in FIG. 1.

The bolt head 7 is adjoined inside the through-opening 15 by a thread-free portion 13 of the support bolt 6, within which the support bolt 6 is supported and retained in the through-opening 15 of the ring holder 4 by means of a ball bearing 9.

The connection device 1 further also comprises a sleeve 11 which is inserted axially onto the threaded shaft from the lower side of the threaded shaft 8 and which has at the lower end thereof a radially protruding end flange 12 whose diameter is so large that in the completely fitted state of the sleeve 11 it covers the lower side of the ring holder 4 and in this instance also covers the two recesses 5 at the lower side on the ring holder 4 so that the end regions 3 of the lifting lug 2 which are inserted therein can no longer be moved out of the recesses 5.

At the upper side of the ring holder 4 there is provided a face 14 which extends around the through-opening 15 and which, when the support bolt 6 is assembled, has a very small spacing from the lower side of the bolt head 7. The support bolt 6 is connected to the ring holder 4 by means of the ball bearing 9 whose balls are partially received in a guiding groove 16 which is formed on the thread-free portion 13 of the support bolt 6 and partially in an associated receiving groove 17 which is provided in the through-opening 15 in the ring holder 4.

Since, as a result of the ball bearing 9, the support bolt 6 is not only rotatably supported in the through-opening 15 of the ring holder 4 but instead is also connected to the ring holder 4, a small gap between the lower side of the bolt head 7 and the face 14 at the top of the ring holder 4 ensures a slight rotatability of the support bolt 6 relative to the ring holder 4 with only small friction forces when the bolt head 7 of the support bolt 6 is not blocked in terms of rotation.

Figure 4:
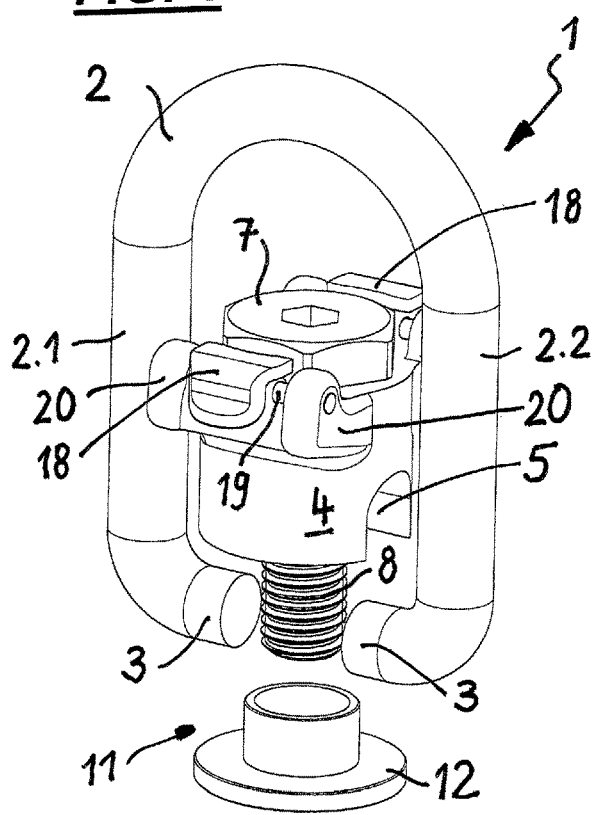
FIG. 4 shows the connection device of FIG. 1, but with the sleeve pulled off downward and with the ring holder lifted upward from the two end regions of the lifting lug.

As can be seen from the illustrations of FIGS. 1, 3 and 4, at the upper side of the ring holder 4 at both sides of the bolt head 7 which is constructed in hexagonal form, there are fitted two mutually opposing locking members in the form of tilting levers 18 which are located symmetrically relative to the clamping plane of the inner opening of the lifting lug 2. As can be seen in the Figures, each of these tilting levers 18 is located on a rotation axle 19 which is connected to the ring holder 4 at both sides of the tilting lever 18 in each case by means of a bearing block 20.

In this instance, the arrangement of the tilting levers 18 and the bearing blocks 20 is constructed in such a manner that each tilting lever 18, when it is pivoted from the initial position thereof (illustrated in FIGS. 1, 3 and 4) inward in the direction toward the bolt head 7, assumes a locking position at that location in which it forms an operational connection with an associated side face 22 of the hexagon of the bolt head 7 by moving into abutment with the lever member 21 at that location against this side face 22 of the hexagon of the bolt head 7. Consequently, a locking position of the tilting lever 18, in which the end face of the lever member 21 located in the rotation direction is in abutment with the surface 14 on the ring holder 4, is achieved.

In this manner, by tilting the tilting levers 18 inward toward the bolt head 7 by forming this locking position, a rotational blocking of the support bolt 6 can be achieved which can be carried out manually without difficulty.

Only when the tilting levers 18 are tilted into their outwardly folded-out initial position again, as shown in FIGS. 1, 3 and 4, is the bolt head 7 released again in the rotation direction and can then be rotated relative to the ring holder 4 via the ball bearing 9.

Figure 5:
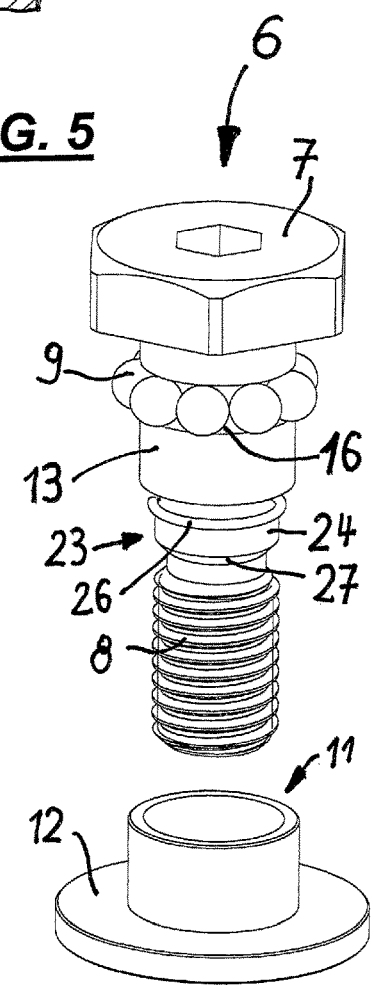
FIG. 5 is an enlarged perspective illustration of the support bolt with the sleeve pulled off axially downward.

FIG. 5 shows an enlarged illustration of the support bolt 6 in the disassembled state, wherein, at this location below the threaded shaft 8, the sleeve 11 which can be pushed onto it with the lower circular, radially expanded end flange 12 is also shown.

As can be seen in FIG. 5, the lower side of the bolt head 7 is adjoined by the thread-free portion 13 of the support bolt 6, which is provided slightly above the center of the axial length thereof with the guiding groove 16 in which the balls of the ball bearing 9 engage with one half thereof. In FIG. 5, the balls of the ball bearing 9 are shown in this engaged state, wherein the other radially outer halves thereof are received in a receiving groove 17 which is formed in the through-opening 15 of the ring holder 4 (FIG. 4).

Between this thread-free portion 13 of the support bolt shaft and the threaded shaft 8 which is fitted to the axial end region thereof is a shaft portion 23 of reduced diameter, which the threaded shaft 8 then axially adjoins (FIG. 5).

As already mentioned, for the assembled state of the connection device 1 according to the invention, as shown, for instance, in FIGS. 1 and 2, the sleeve 11 is axially displaced from the free end of the threaded shaft 8 over the threaded shaft until it has assumed a securing position.

In this regard, reference is now made to the illustrations of FIGS. 6 and 7 which show an enlarged, sectioned detailed illustration of a portion of the support bolt 6 and the sleeve 11 which has been pushed upward onto it, wherein in FIG. 6 the sleeve 11 has already been pushed up over the threaded shaft, but has not yet reached the securing end position thereof.

FIG. 7 now shows the state in which the sleeve 11 is located in the state in which it is pushed completely upward onto the shaft of the support bolt 6 and in which it has reached the securing position thereof with the support bolt 6.

As can be seen in FIGS. 6 and 7, in the region of the shaft portion 23 which extends between the thread-free portion 13 and the threaded shaft 8, there is formed on the shaft portion 23 a radially expanded annular bead 24 whose outer periphery has a radial diameter which is constructed to be slightly smaller than the inner diameter of the sleeve 11.

There is formed on the inner face of the sleeve 11 an annularly extending peripheral receiving groove 25 in which a snap ring 26 is located and in this instance protrudes only so far into the receiving groove 25 that it is retained therein in an axial direction in its non-tensioned state. In this instance, however, the cross-section of the receiving groove 25 in the direction of the radial extent thereof in the wall of the sleeve 11 is constructed to be so large that the snap ring 26 with a radial expansion can be completely received in the receiving groove 25 in such a manner that it no longer protrudes radially therefrom into the inner opening of the sleeve 11.

The bead 24 is provided at the side thereof facing the threaded shaft 8 with a peripheral inclined starting member 27 which extends in an axial direction obliquely relative to the axial center axis of the support bolt 6 and which extends from a location of a radially smaller diameter with spacing from the threaded shaft 8 obliquely as far as a location of a larger diameter, that is to say, as far as the beginning of the radial outer face of the bead 24, as can be seen in FIGS. 5 and 6.

At the axially opposing axial end of the bead 24 facing the thread-free portion 13 there is also provided an inclined starting member 28 which, however, extends in the opposite direction to the inclined starting member 27 and also over only a smaller diameter change of the shaft portion 23.

The snap ring 26 which is received at the inner face of the sleeve 11 in the receiving groove 25 in the non-tensioned state protrudes, as shown in FIG. 6, in the non-tensioned state thereof by slightly less than the radial half thereof into the inner space of the sleeve 11. If this sleeve 11 is now pushed axially onto the shaft of the support bolt 6 from the lower side thereof, the snap ring 26, during the axial movement of the sleeve 11, initially moves into abutment against the inclined starting member 27 by means of which, when the relative axial movement between the sleeve 11 and shaft portion 23 is continued, it is radially expanded outward and in this instance pressed radially further into the receiving groove 25 whist it is being displaced over the radial outer face of the bead 24, into abutment therewith, through the sleeve 11.

As soon as the sleeve 11 has been axially displaced to such an extent that the snap ring 26 has arrived at the other counter-inclined starting face 28, in the case of continued axial movement of the sleeve 11, as a result of the resilient restoring force produced by the expansion thereof, it is deflected radially inward again whilst it slides along the inclined starting member 28.

In this instance, the position of the receiving groove 25 in the sleeve 11 relative to the free end thereof is selected in such a manner that, when the end face of the sleeve 11 strikes the lower side of the opposing radially enlarged, thread-free portion 13, the snap ring 26 has again deflected radially inward to such an extent that it has arrived precisely at the axial, radially inner end of the inclined starting member 28, as can be seen in FIG. 7.

In this state, the sleeve 11 is axially secured with respect to the support bolt 6 by means of cooperation of the deflected snap ring 26 and the inclined starting member 28 facing it in a securing position, whereby the sleeve 11 is retained on the support bolt 6.

If the sleeve 11 is now intended to be removed from the support bolt 6, it is simply necessary to apply to the sleeve 11 a tension axially in the direction away from the thread-free portion 13. This results in the snap ring 26 then opening out again radially outward in the receiving groove 25 during the triggered axial movement between the sleeve 11 and support bolt 6 as a result of the inclined starting member 28, being displaced in this state over the outer peripheral face of the bead 24 and being resiliently radially deflected again along the following inclined starting member 27 at the other axial end of the bead 24, whereby there is no longer a locking position between the sleeve 11 and the support bolt 6 and the sleeve 11 can then be radially removed from it.

Both the axial pushing of the sleeve 11 onto the support bolt 6 and the axial removal of the fitted sleeve 11 from the bolt requires in each case only axial forces which act on the sleeve 11 and which can bring about the radial rebound of the snap ring 26 via the inclined starting member 27 or the inclined starting member 28, that is to say, relatively low forces which can generally also be applied manually.

As a result of the structure set out in the Figures, it is now possible to proceed in the case of the assembled connection device 1, as can be seen in FIGS. 1 and 2, by axially removing the sleeve 11 from the lower side of the ring holder 4 carried out using little force, as shown in FIG. 4, and by subsequently lifting the ring holder 4 with the support bolt 6 and the locking members 18 in an upward direction and removing this raised structural unit from the inner space of the lifting lug 2. Then, through the intermediate space between the then exposed end regions 3 of the lifting lug 2, for example, a closed sling, such as a cable loop or the like, can be introduced and the ring holder 4 can then be placed with the support bolt 6 and locking members 18 again on the end regions 3 of the lifting lug 2 so that they engage again in the open recesses 5 of the ring holder 4. Subsequently, the sleeve 11 is pushed axially upward from below over the threaded portion 8 of the support bolt 6 until it reaches the locking position thereof which is shown in FIG. 7 and in which it is then retained again on the shaft of the support bolt.

This process of suspending or introducing a closed sling may be carried out in a very simple and rapid manner and with little force so that subsequently the suspension of the lifting lug 2 via the closed sling on an associated retention or lifting device can be carried out.

In the assembled state, the through-opening 15 in the ring holder 4 is constructed in such a manner that in the axial region in which in the assembled state the sleeve 11 protrudes axially into the through-opening 15, there is a small radial gap between the inner face of the through-opening 15 and the peripheral face of the axial portion of the sleeve 1 which protrudes therein in order to ensure an easy, friction-free relative rotation between the sleeve 11 and the ring holder 4. In this context, an axial annular gap between the upper side of the radially protruding end flange 12 of the sleeve 11 and the axially lower terminal face of the ring holder 4 is also provided, as all shown in the sectioned illustration of FIG. 3.

It is therefore possible, in the event that the support bolt 6 is not blocked in rotation via the locking members 18, to achieve a rotation thereof with a load 10 coupled to the threaded shaft 8, an orientation of the support bolt 6 in the load direction with respect to the position of the lifting lug 2 without requiring the use of tools.

In all cases, the connection device 1 according to the invention has a comparatively simple construction, in particular with regard to the advantages which are achieved therewith at the same time.

What is claimed is:

1. A connection device for coupling a load to a lifting lug by means of a support bolt, wherein the support bolt comprises a longitudinal axis and is located so as to be able to be rotated about the longitudinal axis in a through-opening of a ring holder, the support bolt has a threaded shaft to be screwed into a load and a bolt head which protrudes radially beyond it and can also be rotated therewith relative to the lifting lug with a coupled load, the support bolt has an unthreaded portion located between the head and threaded shaft, the unthreaded portion comprising a thread-free portion, an annular bead, and an upper and lower recess adjacent the annular bead, the thread-free portion being larger in diameter than the annular bead, upper recess, and lower recess;
   wherein the ring holder is covered at the lower side thereof by an end flange which radially protrudes at the lower end of a sleeve;
   wherein the sleeve can be rotated about the support bolt and is tool-free releasably secured to the support bolt, wherein the sleeve defines an annular groove and is secured by a snap ring on the bolt, the snap ring is received in the annular groove and the upper recess on the support bolt such that the sleeve is releasable from the support bolt by pulling down the sleeve in an axial direction along the longitudinal axis;
   wherein there is provided on the ring holder at least one locking member which can be brought into engagement with the bolt head and which can be moved into a locking position and into an initial position, wherein it blocks the bolt head in terms of rotation with respect to the ring holder in the locking position and is not in engagement with the bolt head in the initial position;
   wherein the support bolt is supported in the through-opening of the ring holder by means of a ball bearing seated within a guiding groove located within the thread-free portion of the support bolt; and
   wherein the lifting lug is constructed as an open ring, the two end regions of which are each bent in the direction toward each other and in the assembled state at mutually opposing sides run radially into recesses which are formed on the lower side of the ring holder and which are in each case open therein in a downward direction.

2. The connection device as claimed in claim 1, wherein the at least one locking member is constructed as a tilting lever.

3. The connection device as claimed in claim 1, wherein the bolt head forms a hexagonal shape when viewed from above.

4. The connection device as claimed in claim 1, wherein the support bolt in the region thereof between the bolt head and the beginning of the threaded shaft thereof is supported by means of the ball bearing on the ring holder.

5. The connection device as claimed in claim 4, wherein the support bolt is provided with the guiding groove which serves to receive the balls of the ball bearing.

6. The connection device as claimed of claim 1, wherein in the assembled state the sleeve is connected to the support bolt by means of the snap ring located in the axial direction above the threaded shaft when seen in the direction towards the bolt head.

7. The connection device as claimed in claim 1, wherein the sleeve comprises an inner opening having an inner face which is provided with the annular groove, and the connection device further includes the snap ring which is, in the non-mounted state of the sleeve, located in the annular groove:
   wherein, if a snap ring rest state, the snap ring protrudes radially inwardly from the inner face into the inner opening of the sleeve; and
   wherein the radially outwardly protruding annular bead is formed on the shaft of the support bolt in a region between the bolt head and the threaded shaft, the radially inwardly protruding annular bead comprising two axial ends each having an inclined starting member such that, when the sleeve is axially pushed on the support bolt or removed from the support bolt, the snap ring is expanded radially via one of the inclined starting members into the annular groove in the sleeve and, after having passed over the other inclined starting member, resiliently retracts again radially into the snap ring rest state.

8. The connection device as claimed of claim 1, wherein the support bolt comprises a ring shoulder facing away from the bolt head and the sleeve engages the ring shoulder which presses the sleeve flange downwards when the threaded shaft of the support bolt is screwed into the load.

9. The connection device as claimed of claim 1, where an axial annular gap is provided between an upper side of the sleeve and the axially lower terminal face of the ring holder allowing rotation of the ring holder against the sleeve.

* * * * *